United States Patent [19]

Brackett

[11] 4,055,227

[45] Oct. 25, 1977

[54] HEAVY DUTY HYDRAULIC WEIGHING APPARATUS

[75] Inventor: George E. Brackett, Nashua, N.H.

[73] Assignee: The A. H. Emery Company, New Canaan, Conn.

[21] Appl. No.: 683,897

[22] Filed: May 6, 1976

Related U.S. Application Data

[63] Continuation-in-part of Ser. No. 619,395, Oct. 3, 1975, abandoned.

[51] Int. Cl.² .............................................. G01G 5/04
[52] U.S. Cl. ................................................... 177/208
[58] Field of Search .............................. 177/208, 209

[56] References Cited

U.S. PATENT DOCUMENTS

| | | | |
|---|---|---|---|
| 2,392,702 | 1/1946 | Saunders | 177/208 |
| 2,960,113 | 11/1960 | Bradley | 177/208 X |
| 3,339,462 | 9/1967 | Bankowski | 177/208 X |

Primary Examiner—George H. Miller, Jr.
Attorney, Agent, or Firm—St.Onge, Mayers, Steward & Reens

[57] ABSTRACT

A heavy duty hydraulic weighing apparatus includes an integral base having a piston mounted in and encircled by an annular ring, a cooperating cylinder which fits radially between the piston and ring to receive the piston in freely interfittable relatively reciprocally moveable relation, and a flexible diaphragm of fluid impervious material sealed in the cylinder and overlying the piston to form a pressure receiving chamber. A bearing arrangement, which facilitates free relative reciprocal movement between the piston and base and the cylinder to permit heavy loading, comprises a plurality of cylindrical raceways, a first portion of each being defined in the outer wall of the cylinder and a second portion of each being defined in the inner wall of the annular ring. First and second bearing inserts, which are highly resistant to wear and minimize bearing friction, at least partially line the first and second raceway portions respectively. These inserts are arcuate, having angular dimensions less than the angular dimensions of the raceway portion in which they are installed, and are recessed into the raceway portions to be firmly held therein. Ball bearings are disposed in each raceway and springs loosely position each ball bearing to contact the bearing inserts.

3 Claims, 8 Drawing Figures

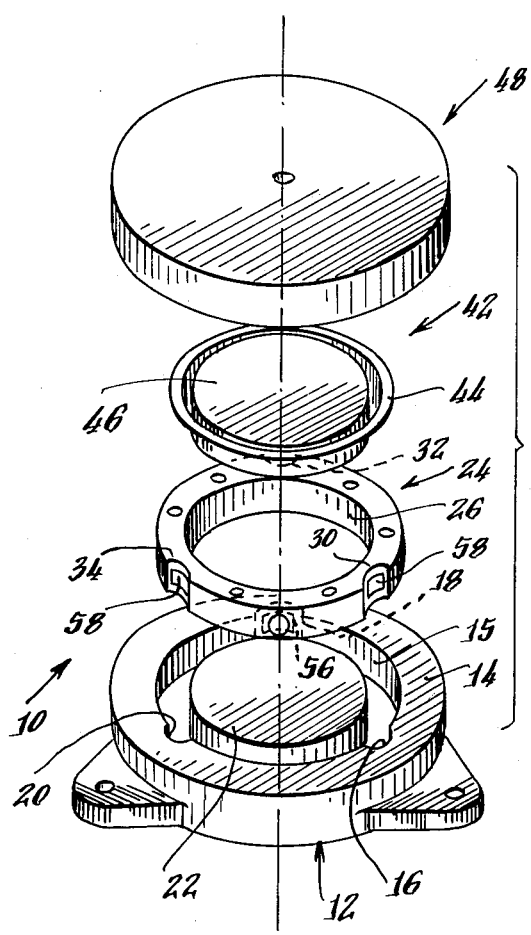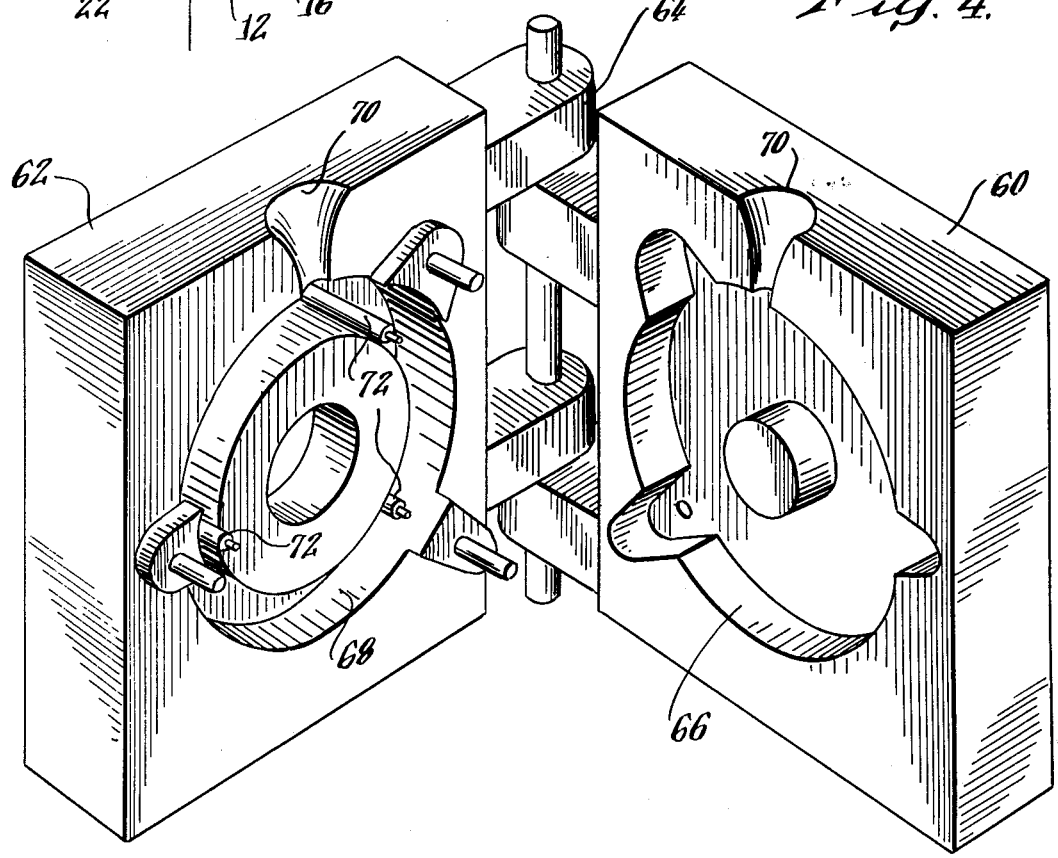

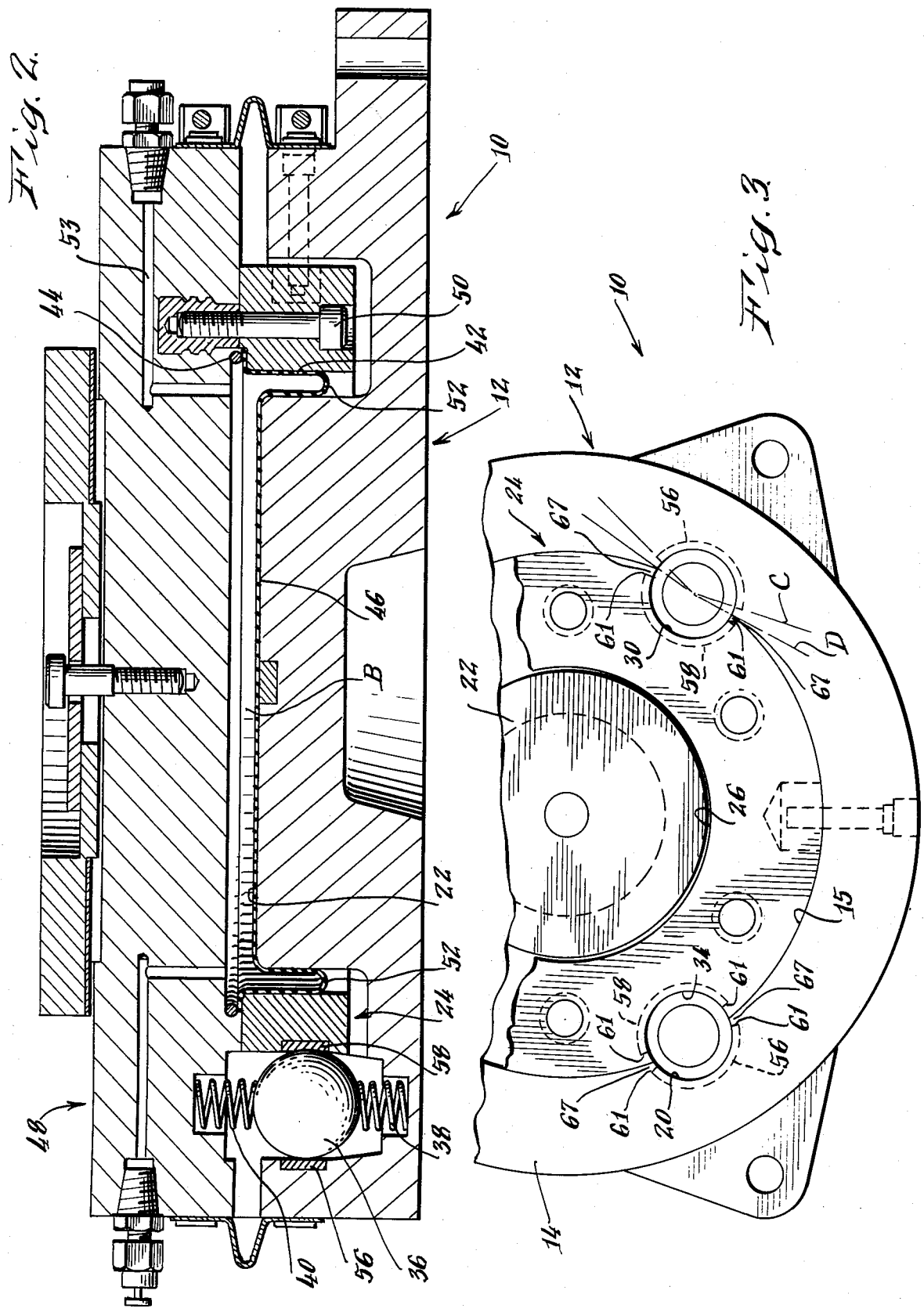

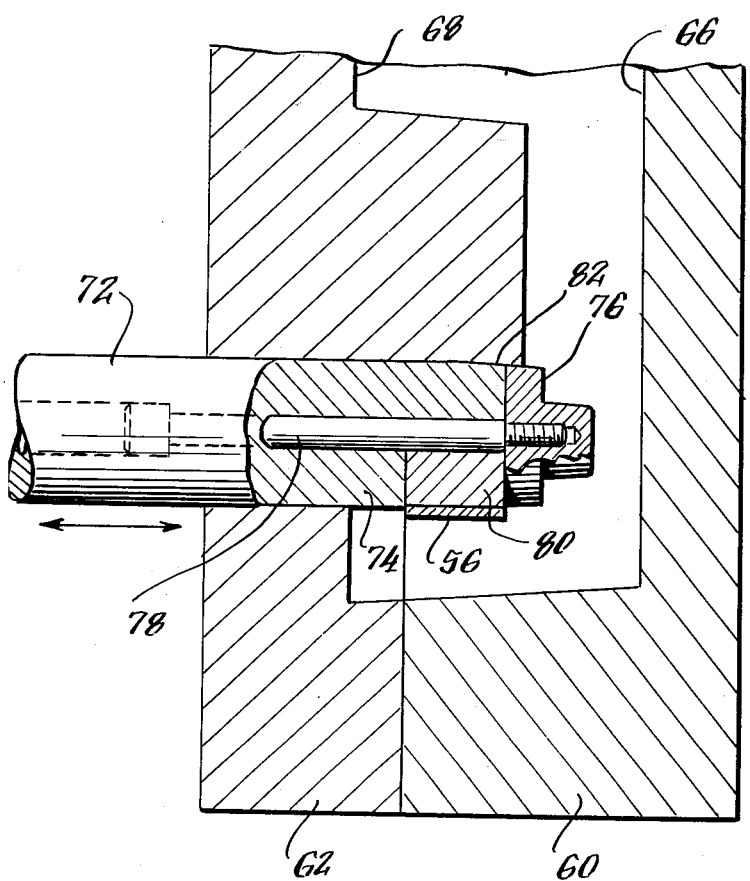
Fig. 5.
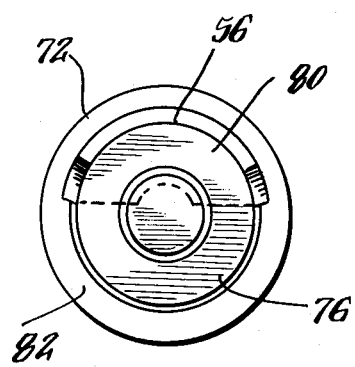
Fig. 6.
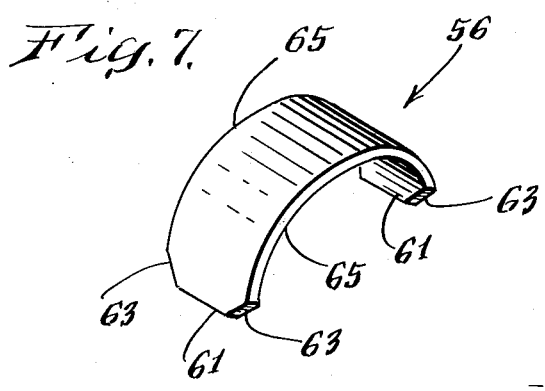
Fig. 7.
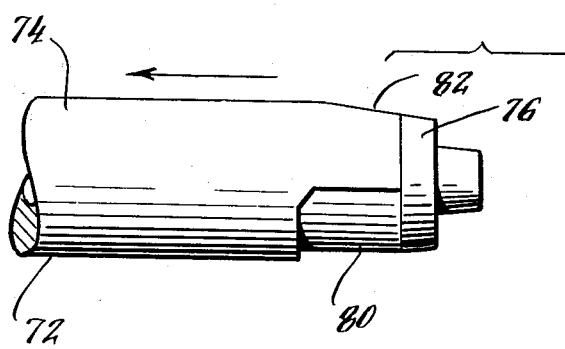
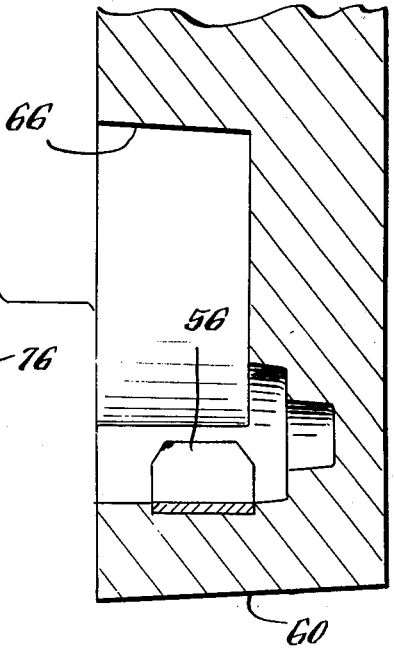
Fig. 8.

HEAVY DUTY HYDRAULIC WEIGHING APPARATUS

BACKGROUND OF THE INVENTION

The present patent application is a continuation-in-part of U.S. patent application Ser. No. 619,395 (Brackett), now abandoned, filed on Oct. 3, 1975 and assigned to the assignee of the present invention.

FIELD OF THE INVENTION

The present invention relates to a heavy duty hydraulic weighing apparatus which includes a durable, wear-resistant bearing arrangement that facilitates free relative movement between reciprocating apparatus components. Further, this invention relates to methods and apparatus for positioning previously manufactured bearing inserts as well as other inserts in the cast weighing apparatus components during the casting process.

The weighing apparatus of the present invention may be advantageously used in any application where a large weighing capacity is needed. The insert positioning apparatus and method may be used to produce the components of this hydraulic weighing apparatus which are cast from aluminum and have hardened steel bearing inserts and threaded couplings mounted at specific locations therein.

However, the insert positioning apparatus and method may also be used to produce articles from any casting or molding material which include a previously manufactured insert for whatever purpose. As used in this specification, then, the term "cast article" is intended to mean any article, part, component, or the like made by introducing, with or without pressure, a liquified material into a mold. The term "casting" is intended to mean any process for forming an article, part, component or the like by introducing a liquified material into a mold. Thereafter, the liquified material is solidified, usually by cooling it. Such processes include open molding, injection molding, die casting, sand casting or other similar processes.

DESCRIPTION OF THE PRIOR ART

Hydraulic weighing apparatus of the general type with which the present invention is concerned are disclosed in, for example, U.S. Pat. Nos. 2,960,113 (Bradley); 3,089,518 (Bradley); 3,089,519 (Bradley); and 3,145,795 (Tate); all assigned to the assignee of the present invention.

Various methods of casting articles such as weighing apparatus components are also known. One precision permanent mold casting technique is disclosed in a brochure entitled "Aluminum Permanent Mold Casting", published by Diamond Casting and Machine Company, Inc., P.O. Box 217, Hollis, New Hampshire. This technique is suitable for casting intricate, thin-walled articles having complex shapes.

SUMMARY OF THE INVENTION

In a preferred embodiment, to be described below in detail, the hydraulic weighing apparatus of the present invention includes a piston, an annular ring fixed with and encircling the piston to form an integral base member, a cooperating cylinder for receiving the piston in freely interfittable, relatively reciprocally moveable relation while lying between the piston and ring, and a flexible diaphragm of fluid impervious material sealed in the cylinder and overlying the piston to form a fluid pressure receiving chamber therebetween.

A highly durable and wear resistant bearing arrangement is incorporated in this weighing apparatus for minimizing friction to facilitate free relative reciprocal movement between the piston member and ring and the cylinder. This bearing arrangement comprises a plurality of cylindrical raceways. A first partially cylindrical portion of each raceway is defined in the outer wall of the cylinder and a second partially cylindrical portion of each raceway is defined in the inner wall of the annular ring. Each raceway portion, defined in both the cylinder and ring, is lined with a bearing insert of hardened, nickel-plated steel.

The insert and raceway configuration is designed to provide firm insert-component interengagement throughout the useful life of the weighing apparatus. In particular, each raceway insert is formed of an arcuate strip which is recessed into the cylindrical raceway portion in which it is installed. The insert has two opposing edges which extend substantially parallel to the axis of the insert arc which also has an angular dimension less than the angular dimension of the corresponding raceway portion. Since the inserts are recessed into the raceway portions, the material from which the base and cylinder are cast flows around, extends beyond, and firmly abuts these opposing insert edges to prevent relative disengagement of the insert from the component.

The bearing arrangement also includes a ball bearing disposed in each raceway and a spring assembly for positioning each ball bearing to contact the respective bearing inserts.

Since the ball bearing is held to contact the hardened raceway insert, component wear which might be experienced in the absence of such insert is substantially reduced. Moreover, the hardened insert surface tends to reduce the total movement friction between the piston and ring and the cylinder.

The methods for positioning the bearing insert in a cast component of the weighing apparatus and for producing the cast components which include such bearing inserts comprise a series of steps performed during the casting process that locate the insert prior to introduction of casting material about it. The insert positioning apparatus of the invention provides a means for practicing these methods.

Each component is cast in a mold cavity defined by mating mold cavity portions formed in two opposing mold members. This mold cavity determines the configuration of the component. An insert mounting pin cooperates with the mold members and has an insert locating portion. As noted, the insert is made of a magnetically attractable material, specifically hardened steel, and the insert locating portion of the mounting pin is made of a magnetically attracting material, such as a permanent ferromagnet or an electromagnet.

The insert mounting pin is positioned in the mold cavity to position the insert locating portion at the desired insert location. Then, the insert is engaged and held on this locating portion by the mutual magnetic attraction. The mold members are mated together and casting material, such as molten aluminum, is introduced into the mold cavity about the insert and the insert mounting pin. After this casting material has solidified, the insert mounting pin is withdrawn from the mold cavity, the mold members are separated, and the cast article is stripped from the mold cavity portions.

Since the molten casting material has solidified about the insert in a configuration described above, it is retained in the weighing apparatus component.

The insert may be provided with a knurled exterior, that is, one scored by a series of grooves or ribs. When casting material is introduced about the insert, it fills the grooves and further serves to lock the insert in the article.

The methods and apparatus of the present invention for positioning an insert in a cast article are particularly well suited for use with permanent casting apparatus in permanent casting processes for forming cast articles. The insert mount may be accurately located in a permanent mold member to, in turn, accurately locate the insert in the article. However, these methods may also be used with other casting techniques such as san casting.

The methods of the present invention provide a simple, economical, yet accurate means for positioning an insert in cast articles of many types and are specifically adapted for positioning bearing inserts in components of heavy duty weighing apparatus. The weighing apparatus made by these methods and apparatus are capable of heavy-duty use, have a long useful life and are extremely accurate. Accordingly, it is an object of the present invention to provide methods and apparatus for positioning inserts in cast articles and for producing cast articles having such inserts. It is also an object of the invention to provide a heavy-duty weighing apparatus made with these methods and apparatus.

Other objects, aspects, and advantages of the present invention will be pointed out in, or will be understood from, the following detailed description provided below in conjunction with the accompanying drawings.

BRIEF DESCRIPTION OF THE DRAWINGS

FIG. 1 is an exploded perspective view of a hydraulic weighing apparatus having a durable, wear resistant bearing arrangement which facilitates free relative movement between reciprocating apparatus components.

FIG. 2 is a vertical cross-sectional view of this weighing apparatus showing the location of each hardened insert positioned during the component forming process by the methods and apparatus of the present invention.

FIG. 3 is a top plan view of the piston and base and of the cylinder of this weighing apparatus also showing location of the hardened inserts.

FIG. 4 is a perspective view of a permanent mold apparatus equipped with insert locating apparatus.

FIG. 5 is a vertical cross-sectional view of an insert mounting pin and the permanent mold members prior to introduction of casting material into the mold cavity.

FIG. 6 is an end view of the insert mounting pin.

FIG. 7 is a perspective view of a hardened bearing insert which may be positioned by the apparatus shown in FIGS. 3 through 5.

FIG. 8 is a partial vertical cross-sectional view of the component after it has been cast, illustrated with the insert mounting pin withdrawn from it.

DETAILED DESCRIPTION OF THE PREFERRED EMBODIMENTS

The heavy duty hydraulic weighing apparatus also known as a load cell, which incorporates a wear resistant and friction minimizing bearing arrangement, in accordance with the invention, may be described with reference to FIGS. 1, 2 and 3.

The basic load cell, generally indicated at 10 and more fully described in U.S. Pat. No. 3,089,518 (Bradley), includes a cast aluminum base member 12 that has an annular outer ring 14 which defines an inner cylindrical wall 15. A plurality of partially cylindrical recesses or raceway portions 16, 18 and 20, equally spaced from one another, are formed in wall 15. A fixed cylindrical piston 22, made integrally with base member 12, projects upwardly within and is concentric with the annular ring 14.

A cast aluminum cylindrical collar member 24 has a central cylindrical inner opening 26, adapted to fit loosely over the piston 22, and an outer cylindrical wall 28 of diameter less than the opening defined by the inner wall 15 of ring 14. The outer cylindrical wall 28 of collar member 24 is also formed with a plurality of partially cylindrical recess or raceway portions 30, 32 and 34 which are adapted to be aligned axially with the corresponding base member recesses 16, 18 and 20 to form a plurality of ball bearing race cavities or raceways that extend parallel to the vertical axis A of the load cell assembly. A ball bearing 36 (FIG. 2) is held in each bearing raceway by opposing compressed springs 38 and 40 and facilitates free relative vertical movement of the collar member in the base member.

A flexible diaphragm 42, made from a fluid impervious, pliable yet substantially inextensible plastic material, includes an outer substantially planar flange portion 44 and a central cup-shaped portion 46. The diaphragm flange 44 is clamped between the upper planar surface of collar member 24 and the bottom planar surface of a cast aluminum hydraulic pressure block 48 by a series of machine screws 50 (FIG. 2). The block 48, diaphragm 42, and collar 24 assembly thus comprise a moveable cylinder which is cooperatively engaged with the fixed annular ring 14 and piston 22 of base member 12.

When the block, diaphragm, and collar are assembled, the cup-shaped diaphragm portion 46 overlies the upwardly facing planar surface of piston 22 while an annular loop 52 (FIG. 2) of the flexible diaphragm interlies between the cylindrical side wall of piston 22 and the cylindrical opening 26 of collar member 24. Accordingly, a substantially friction-free hydraulic seal between the piston 22 and the moveabl collar member 24 is formed.

Hydraulic fluids is contained in the remaining space B between the upper surface of the cup-shaped diaphragm portion 46 and the lower surface of the pressure block 48 and is conducted through a fluid pressure line 53 which is connected to a suitable pressure gauge (not shown). Accordingly, downward movement of the pressure block 48 caused by a load received on its upper surface, decreases the volume of fluid space B to force hydraulic fluid therefrom through pressure line 53 to the gauge which is calibrated to yield a measure of the load.

As shown in detail in FIGS. 2 and 3, the bearing raceways defined by corresponding base member and collar member raceway portions are provided with arcuate strips of hardened nickel-plated steel forming bearing inserts 56 and 58 which are far more resistant to wear and thus far more durable than the unreinforced casting material, namely aluminum. Moreover, since the bearing inserts are hardened and plated, friction between them and the associated ball bearings is minimized.

Each raceway insert is recessed into the raceway portion in which it is installed to be firmly locked therein during the casting process as described below in detail. As can be seen in detail in FIGS. 1, 3 and 7, each insert has two opposing edges 61 which extend substantially parallel to the axis of the arcuate strip. Each edge 61 further has two beveled corners 63. Thus, when cast about the insert, the component material flows around the opposing edges 61, beveled corners 63 as well as the arcuate edges 65 of the insert. Therefore, as can be seen in FIGS. 2 and 3, disengagement of each insert from the component in which it is installed is prevented by the component material which abuts the insert edges. In particular, component material flows around insert edges 61 and beveled corners 63 to form webs 67 (FIG. 3). In order to achieve the firm interengagement of the insert and the cast component and to insure that webs 67 are properly and substantially formed, the insert should have angular dimension C less than the angular dimension D of the cylindrical raceway portion in which the insert is installed.

The methods and apparatus of the present invention for locating inserts in cast articles may be used to produce various components such as the base member 12 and collar member 14 having bearing inserts described above. These methods may be practiced with the permanent mold apparatus shown in FIG. 4 which, as illustrated, is designed to produce base members 12. Of course the mold apparatus may be configured to produce other components. This mold apparatus comprises mating mold or die members 60 and 62 which are mounted to be closed together on a heavy hinge assembly 64. Each mold member has a mold cavity portion 66 and 68 respectively, which together define a single mold cavity when mold members 60 and 62 are closed. This mold cavity determines the configuration of base member 12. Mold members 60 and 62 also define, when closed, an introduction passage 70 through which a molten casting material such as aluminum is poured ino the mold cavity.

As can be seen in FIGS. 4 and 5, a series of insert mounts in the form of elongated pins 72 are mounted in mold member 62 for axial, reciprocal movement. These pins define the plurality of recesses 16, 18 and 20 in base member 12 when the article is cast. As shown in detail in FIGS. 5 and 6, each pin includes a main body portion 74 having a clamping nose 76 mounted at one end by a machine screw 78. The clamping nose 76 retains a permanent magnet 80 at the end of the pin 72, which is shaped to retain the hardened steel bearing insert 56 thereon and, accordingly, serves as an insert locating portion of the insert mounting pin 72. Magnet 80 may, if desired, be an electromagnet which is operated with a suitable source of electric current. However, a permanent magnet may be preferable when molten metal is being cast because such a permanent magnet is less susceptible to damage at ordinarily high molten metal temperatures.

The methods of the present invention are practiced by first positioning the insert mounting pins 72 in the mold cavity portion 68 of die member 62 to locate the inserts at their desired locations therein. The hardened steel inserts are then engaged on the insert locating portions, i.e., the permanent magnets 80, of the mounting pins 72. The mutual magnetic attraction holds the inserts in place. Subsequently, the mold members 60 and 62 are mated together and casting material, in this case molten aluminum, is introduced into the single mold cavity through introduction passage 70. After the aluminum has solidified, the insert mounting pins are withdrawn from the mold cavity and the cast article, as shown in FIG. 8. Since the aluminum has been cast around the inserts, they are firmly retained in the article.

The insert mounting pins may be formed with slightly tapered tips 82 which facilitate pin withdrawal from the completed article.

Finally, the mold members are separated and the article is stripped from the mold cavity with the insert firmly located therein.

Inserts may also be provided with bias ground knurling to enhance the firm engagement of them in the cast article.

The methods and apparatus of the present invention may be used to position these and other inserts in various cast articles. The insert mounting pin can easily be designed to correctly receive each different insert. Moreover, the methods and apparatus may be used to make cast articles by various molding techniques other than the permanent mold casting technique described above. For example, they may be used with sand casting techniques and processes.

It has further been found that the steel inserts molded into the cast article retain their hardness to a very high degree, especially when nickel-plated. For example, a typical insert for use in the hydraulic load cell shown should have a hardness of about 57 – 59 Rockwell C to match the ball bearing hardness. In starting with an insert having a hardness of 61 on the Rockwell C scale, it was found that the insert retained a hardness of at least 57 Rockwell C after being cast in accordance with the invention. It is believed that the insert undergoes a second "draw" in the casting process to achieve this hardness.

It is known that steel, for example A2 steel (ASTME), may be subjected to a first annealing heat treatment at about 2100° F. for about 10 minutes and then air cooled to room temperature. A second heat treatment or "draw" at about 400° F. for about one-half hour followed by air quenching provides a hardness of about 61 Rockwell C for such a steel. The inserts 56 and 58 when positioned in the mold, are heated to a temperature of about 800°–850° F. by the molten metal and are then slowly cooled as the casting cools. If the temperature in the casting process exceeds 900° F., the inserts will soften. Accordingly, it is important that the temperature of the inserts be maintained below 900° F., and preferably below 850° F., so that there is little or no loss of hardness in the insert due to the heat of the molten metal.

The effect of the casting method of the invention is to provide a "double draw" to achieve hardness, i.e., there is a first draw or air quenching of the steel insert to provide a hardness of about 61 Rockwell C and the second "draw" occurs in the insert steel by being subjected to the heat of the molten metal. The aluminum alloy is poured at about 110° F., but the continuous mold operations maintain the heat of the casting at about 800° F. to 850° F. This second "drawing" or annealing of the insert thus maintains the hardness of the inserts which is necessary because of the hardness of the balls which bear against them.

A variety of insert shapes may be cast in accordance with the invention to provide a bearing surface, raceway or for any other requirement of a hard surface portion on a cast part. For example, an insert in the shape of a spherical portion may be cast onto a part that could replace a ball-bearing or other rounded pivot of more expensive metal since the contact area itself for such a pivot would be relatively small. Further, the rounded or spherical inserts may be convex or concave to provide hard bearing surfaces on a relatively soft metal casting.

For the retention of hardness, the cast metal part may be made of aluminum or magnesium, or aluminum or magnesium alloys. These metals all can be cast within the temperature ranges required to substantially retain insert hardness in a cast part.

Although specific embodiments of heavy-duty hydraulic weighing apparatus as well as the casting methods and apparatus of the present invention have been disclosed above in detail, it is to be understood that this is for purposes of illustration. Modifications may be made to the described methods and apparatus by those skilled in the art in order to adapt them to various applications.

What is claimed is:

1. In a hydraulic weighing apparatus which includes a piston, an annular ring fixed with and encircling the piston, a cooperating cylinder which fits radially between the ring and piston for receiving the piston in freely interfittable, relatively reciprocally movable relation, and a flexible diaphragm of fluid impervious material sealed in the cylinder and overlying the piston to form a fluid pressure receiving chamber therebetween which is adapted for fluid communication with an indicating device; a bearing arrangement for facilitating free relative reciprocal movement between the piston and ring and the cylinder comprising:
   A. a plurality of cylindrical raceways, a first portion of each raceway being defined in the outer wall of the cylinder and a second portion of each raceway being defined in the inner wall of the ring;
   B. a first bearing insert at least partially lining each of said first raceway portions;
   C. a second bearing insert at least partially lining each of said second raceway portions; each of said first and second bearing inserts comprising a hardened, arcuate strip having an angular dimension less than the angular dimension of said raceway portion which said insert lines, said insert being recessed into said raceway portion and having two opposing edges extending substantially parallel to the axis about which said strip is arcuate, said raceway portion circumferentially extending beyond and abutting said opposing insert edges to form webs that firmly lock said insert therein;
   D. ball bearing means disposed in each raceway; and
   E. means for positioning each ball bearing means to contact said first and second bearing inserts in each raceway.

2. The bearing arrangement for facilitating free relative, reciprocal movement between the piston and ring and the cylinder in a hydraulic weighing apparatus as claimed in claim 1 wherein said opposing insert edges have beveled corners.

3. In a hydraulic weighing apparatus which includes a piston, an annular ring fixed with and encircling the piston, a cooperating cylinder which fits radially between the ring and piston for receiving the piston in freely interfittable, relatively reciprocally movable relation, and a flexible diaphragm of fluid impervious material sealed in the cylinder and overlying the piston to form a fluid pressure receiving chamber therebetween which is adapted for fluid communication with an indicating device; a bearing arrangement for facilitating free relative reciprocal movement between the piston and ring and the cylinder comprising:
   A. a plurality of cylindrical raceways, a first portion of each raceway being defined in the outer wall of the cylinder and a second portion of each raceway being defined in the inner wall of the ring;
   B. a first bearing insert at least partially lining each of said first raceway portions;
   C. a second bearing insert at least partially lining each of said second raceway portions; each of said first and second bearing inserts comprising a hardened arcuate strip, which is recessed into its associated raceway portion and has two opposing edges extending substantially parallel to the axis about which said strip is arcuate, each of said opposing insert edges having beveled corners; said raceway portion, which each insert lines, at least extending beyond and abutting said beveled corners to form webs that firmly lock said insert therein;
   D. ball bearing means disposed in each raceway; and
   E. means for positioning each ball bearing means to contact said first and second bearing inserts in each raceway.

* * * * *

UNITED STATES PATENT AND TRADEMARK OFFICE
CERTIFICATE OF CORRECTION

PATENT NO. : 4,055,227
DATED : October 25, 1977
INVENTOR(S) : George E. Brackett It is certified that error appears in the above-identified patent and that said Letters Patent are hereby corrected as shown below:

Column 3, line 16 "san" should read --sand--.

Column 4, line 46 "moveabl" should read --moveable--.

Column 4, line 48 "fluids" should read --fluid--.

Column 5, line 25 "14" should read --24--.

Column 6, line 59 "110" should read --1100--.

In FIGURE 1 label vertical axis "A".

Label the outer wall of Collar 24 "28".

In FIGURE 2, the lead line from reference numeral 44 should continue to the flange of diaphragm 42.

Signed and Sealed this

Thirtieth Day of May 1978

[SEAL]

Attest:

RUTH C. MASON
Attesting Officer

LUTRELLE F. PARKER
Acting Commissioner of Patents and Trademarks